US009792482B2

(12) United States Patent
Shen et al.

(10) Patent No.: US 9,792,482 B2
(45) Date of Patent: Oct. 17, 2017

(54) MULTI-MODE CAPACITIVE SENSOR

(71) Applicant: Synaptics Inc., San Jose, CA (US)

(72) Inventors: Guozhong Shen, San Jose, CA (US); Ozan Ersan Erdogan, San Jose, CA (US); Ajay Taparia, San Jose, CA (US); Erik Jonathon Thompson, Queen Creek, AZ (US)

(73) Assignee: Synaptics Incorporated, San Jose, CA (US)

( * ) Notice: Subject to any disclaimer, the term of this patent is extended or adjusted under 35 U.S.C. 154(b) by 95 days.

(21) Appl. No.: 14/681,811

(22) Filed: Apr. 8, 2015

(65) Prior Publication Data

US 2016/0253539 A1 Sep. 1, 2016

Related U.S. Application Data

(60) Provisional application No. 62/126,207, filed on Feb. 27, 2015.

(51) Int. Cl.
*G01R 27/26* (2006.01)
*G01R 27/28* (2006.01)
(Continued)

(52) U.S. Cl.
CPC ............ *G06K 9/0002* (2013.01); *G01B 7/28* (2013.01)

(58) Field of Classification Search
CPC .. G01R 33/098; G01R 33/096; G01R 19/0084; G01R 33/0011; G01R 33/0052; G01R 15/205; G01R 33/091; G01R 15/202; G01R 27/2605

USPC .......... 324/519, 633, 609, 178, 76.11, 76.75, 324/252, 762.01, 762.05, 719, 71.5, 324/658–690
See application file for complete search history.

(56) References Cited

U.S. PATENT DOCUMENTS 5,767,687 A * 6/1998 Geist .................... G01N 27/221
324/663
6,114,862 A * 9/2000 Tartagni ................. G01B 7/004
324/661

(Continued)

OTHER PUBLICATIONS

International Search Report for PCT/US2016/015165 issued Jun. 14, 2016.

*Primary Examiner* — Patrick Assouad
*Assistant Examiner* — Taqi Nasir
(74) *Attorney, Agent, or Firm* — Leydig, Voit & Mayer, Ltd.

(57) ABSTRACT

A method and device for providing a multi-modal capacitive sensor, including a plurality of sensor electrodes, in an electronic device is provided. In a first mode, the capacitive sensor is configured to capture an image of a biometric object. In a second mode, the capacitive sensor is configured to provide presence detection functionality. In the second mode, the capacitive sensor includes at least one first electrode and at least one second electrode selected from a plurality of sensor electrodes. When operating in the second mode, the at least one first electrode is configured to receive a transmit signal, and the at least one second electrode is configured to receive a resulting signal capacitively coupled from the at least one first electrode. Based on the resulting signal, a processing system of the electronic device determines whether a biometric object to be imaged is present in the sensing area.

25 Claims, 9 Drawing Sheets

(51) Int. Cl.
*G06K 9/00* (2006.01)
*G01B 7/28* (2006.01)

(56) References Cited

U.S. PATENT DOCUMENTS

| | | | | |
|---|---|---|---|---|
| 6,133,743 | A * | 10/2000 | Gleixner | G01B 7/003 |
| | | | | 324/660 |
| 7,643,950 | B1 * | 1/2010 | Getzin | G06K 9/00013 |
| | | | | 340/5.53 |
| 8,779,780 | B1 | 7/2014 | Peterson et al. | |
| 9,064,654 | B2 * | 6/2015 | Whitt, III | H01H 13/704 |
| 9,250,752 | B2 * | 2/2016 | Karpin | G06F 3/0416 |
| 9,383,866 | B2 * | 7/2016 | Lin | G06F 3/0425 |
| 2005/0240788 | A1 * | 10/2005 | Satoh | H04N 1/00885 |
| | | | | 713/323 |
| 2008/0205714 | A1 * | 8/2008 | Benkley | G06F 3/03547 |
| | | | | 382/126 |
| 2012/0044199 | A1 * | 2/2012 | Karpin | G06F 3/0416 |
| | | | | 345/174 |
| 2012/0075249 | A1 * | 3/2012 | Hoch | G06F 3/044 |
| | | | | 345/174 |
| 2012/0105081 | A1 | 5/2012 | Shaikh et al. | |
| 2012/0275669 | A1 | 11/2012 | Kim | |
| 2015/0042600 | A1 * | 2/2015 | Lukanc | G06F 3/0412 |
| | | | | 345/174 |
| 2015/0370364 | A1 * | 12/2015 | Jordan | G06F 3/044 |
| | | | | 345/174 |

* cited by examiner

MULTI-MODE CAPACITIVE SENSOR

CROSS REFERENCE TO RELATED APPLICATIONS

This application claims priority to U.S. provisional patent application Ser. No. 62/126,207, to Ozan Erdogan, et al., filed on Feb. 27, 2015, entitled "CAPACITIVE SENSING," the entire contents of which are herein incorporated by reference.

FIELD OF THE DISCLOSURE

This invention generally relates to electronic sensing, and more particularly, to capacitive fingerprint sensing.

BACKGROUND OF THE DISCLOSURE

Biometric authentication systems are used for authenticating users of devices incorporating the authentication systems. Among other things, biometric sensing technology can provide a reliable, non-intrusive way to verify individual identity for authentication purposes.

Fingerprints, like various other biometric characteristics, are based on unalterable personal characteristics and thus are a reliable mechanism to identify individuals. There are many potential applications for utilization of biometric and fingerprints sensors. For example, electronic fingerprint sensors may be used to provide access control in stationary applications, such as security checkpoints. Electronic fingerprint sensors may also be used to provide access control in portable applications, such as portable computers, personal data assistants (PDAs), cell phones, gaming devices, navigation devices, information appliances, data storage devices, and the like. Accordingly, some applications, particularly portable applications, may require electronic fingerprint sensing systems that are compact, highly reliable, and inexpensive.

Constantly scanning a fingerprint sensor array to capture an image may unnecessarily consume power when there is no corresponding fingerprint to be imaged. To minimize power consumption, a fingerprint presence detection system is sometimes used to detect the presence of a finger before entering a higher power fingerprint imaging mode. One way to do this is to use additional dedicated presence detection sensing elements alongside the sensor array. However, these dedicated elements can be inaccurate and take up valuable device real estate.

In view of the above, there is a need for a finger presence detection system of a fingerprint sensor that provides an accurate indication of finger presence over a sensor, while allowing for the sensor to be smaller or the sensing area to be increased. These and other advantages of the disclosure, as well as additional inventive features, will be apparent from the description of the disclosure provided herein.

BRIEF SUMMARY OF THE DISCLOSURE

One embodiment provides an input device for capacitive sensing, the input device comprising: a plurality of sensor electrodes, the plurality of sensor electrodes including a set of one or more transmitter electrodes and a set of one or more receiver electrodes; and a processing system coupled to the plurality of sensor electrodes and configured to: operate in a first mode by driving transmitter signals onto each of the transmitter electrodes and receiving resulting signals at each of the receiver electrodes, the resulting signals detected at the receiver electrodes corresponding to the transmitter signals driven onto the transmitter electrodes, and operate in a second mode by driving transmitter signals onto at least one first electrode of the plurality of sensor electrodes and detecting resulting signals at at least one second electrode of the plurality of sensor electrodes, the resulting signals detected at the at least one second electrode corresponding to the transmitter signals driven onto the at least one first electrode, wherein a) each of the at least one first electrode and the at least one second electrode are selected from the set of receiver electrodes, or b) each of the at least one first electrode and the at least one second electrode are selected from the set of transmitter electrodes.

Another embodiment includes an electronic system for capacitive sensing, the electronic system comprising: a processing system configured to operate a plurality of sensor electrodes, the plurality of sensor electrodes including a set of one or more transmitter electrodes and a set of one or more receiver electrodes, wherein the processing system is configured to: operate in a first mode by driving transmitter signals onto each of the transmitter electrodes and receiving resulting signals at each of the receiver electrodes, the resulting signals detected at the receiver electrodes corresponding to the transmitter signals driven onto the transmitter electrodes, and operate in a second mode by driving transmitter signals onto at least one first electrode of the plurality of sensor electrodes and detecting resulting signals at at least one second electrode of the plurality of sensor electrodes, the resulting signals detected at the at least one second electrode corresponding to the transmitter signals driven onto the at least one first electrode, wherein a) each of the at least one first electrode and the at least one second electrode are selected from the set of receiver electrodes, or b) each of the at least one first electrode and the at least one second electrode are selected from the set of transmitter electrodes.

Yet another embodiment includes a method for operating a plurality of sensor electrodes for capacitive sensing, the plurality of sensor electrodes including a set of one or more transmitter electrodes and a set of one or more receiver electrodes, the method comprising: operating in a first mode by driving transmitter signals onto each of the transmitter electrodes and receiving resulting signals at each of the receiver electrodes, the resulting signals detected at the receiver electrodes corresponding to the transmitter signals driven onto the transmitter electrodes, and operating in a second mode by driving transmitter signals onto at least one first electrode of the plurality of sensor electrodes and detecting resulting signals at at least one second electrode of the plurality of sensor electrodes, the resulting signals detected at the at least one second electrode corresponding to the transmitter signals driven onto the at least one first electrode, wherein a) each of the at least one first electrode and the at least one second electrode are selected from the set of receiver electrodes, or b) each of the at least one first electrode and the at least one second electrode are selected from the set of transmitter electrodes.

BRIEF DESCRIPTION OF THE DRAWING(S)

The accompanying drawings incorporated in and forming a part of the specification illustrate several aspects of the present disclosure and, together with the description, serve to explain the principles of the disclosure. In the drawings.

While the disclosure will be described in connection with certain preferred embodiments, there is no intent to limit it to those embodiments. On the contrary, the intent is to cover all alternatives, modifications and equivalents as included within the spirit and scope of the disclosure as defined by the appended claims.

DETAILED DESCRIPTION OF THE DISCLOSURE

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One way to detect presence of a finger or other input object is to use one or more dedicated presence sensing elements on the input device. For example, in a fingerprint sensor, finger presence sensing electrodes may be used in addition to the electrodes of a sensing array that are used to capture an image of a fingerprint in a sensing region of the input device. However, this uses up additional device real estate, which may be an especially important consideration in mobile device implementations. In addition, this may not be very accurate because the dedicated finger presence electrodes are typically outside of the sensing array used for imaging the fingerprint, and placing a finger over the dedicated finger presence electrodes does not always equate to a finger placed over the imaging sensor array. A false finger presence might be detected in a case where the finger overlies the dedicated finger presence electrodes but not the imaging sensor array, or conversely, a finger presence might be missed in a case where the finger overlies the imaging sensor array but not the dedicated finger presence electrode.

In an exemplary embodiment of an input device according to principles described herein, these drawbacks may be avoided by re-using selected sensor electrodes of a sensor array for presence detection. This exemplary embodiment may allow space to be saved by avoiding a need for dedicated presence sensing elements, as well as allowing for more accurate presence detection by using electrodes for presence detection that coincide with the sensor array.

Further, with respect to exemplary capacitive sensing applications based on principles of mutual capacitance between rows of parallel receiver electrodes overlapping columns of parallel transmitter electrodes, selected parallel rows of electrodes or parallel columns of electrodes may be used for sensing presence of an input object. This may allow for further improvements, as a sufficient signal from a capacitive coupling between few parallel electrodes may be used to detect presence across a large portion of the sensor array area spanned by the parallel electrodes.

Figure 1:
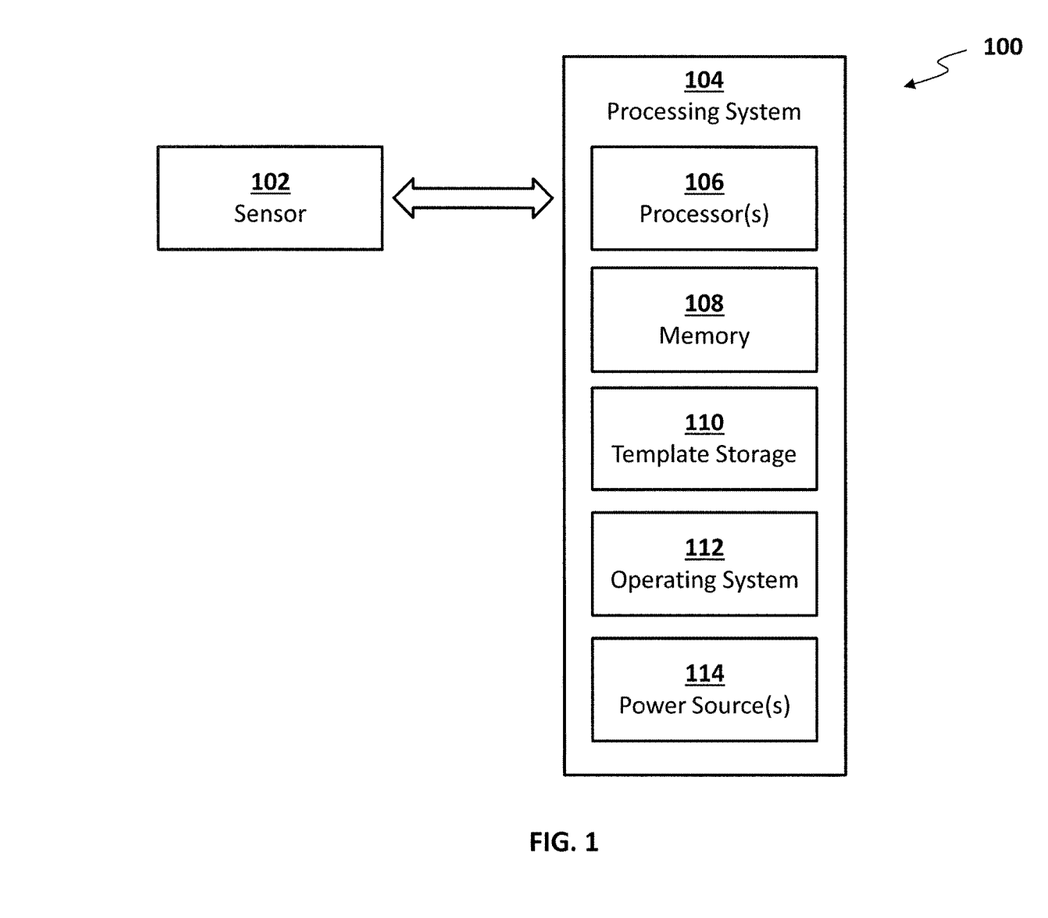
FIG. 1 is a block diagram of an exemplary system that includes an input device and a processing system, in accordance with an embodiment of the disclosure.

Turning now to the figures, FIG. 1 is a block diagram of an electronic system or device 100 that includes an input device such as sensor 102 and processing system 104, in accordance with an embodiment of the disclosure. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic devices include composite input devices, such as physical keyboards and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic device 100 could be a host or a slave to the sensor 102.

Sensor 102 can be implemented as a physical part of the electronic device 100, or can be physically separate from the electronic device 100. As appropriate, the sensor 102 may communicate with parts of the electronic device 100 using any one or more of the following: buses, networks, and other wired or wireless interconnections. Examples include I$^2$C, SPI, PS/2, Universal Serial Bus (USB), Bluetooth, RF, and IRDA.

The device 100 may utilize any combination of sensor components and sensing technologies to detect user input in the sensing region. The device 100 comprises one or more sensing elements for detecting user input. For example, the device 100 may use capacitive techniques, where voltage or current is applied to create an electric field. Nearby input objects cause changes in the electric field, and produce detectable changes in capacitive coupling that may be detected as changes in voltage, current, or the like.

One exemplary capacitive technique utilizes "mutual capacitance" (or "trans-capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "TX electrodes") and one or more receiver sensor electrodes (also "receiver electrodes" or "RX electrodes"). Transmitter sensor electrodes may be modulated relative to a reference voltage to transmit transmitter signals. The reference voltage may be a substantially constant voltage in various embodiments, or the reference voltage may be system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals).

It will be appreciated that embodiments of this disclosure are also usable in environments utilizing "self-capacitance" techniques. "Self capacitance" (or "absolute capacitance") sensing methods are based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

In certain embodiments, sensor 102 is a biometric sensor utilizing one or more various electronic sensing technologies to capture an image of a biometric pattern, such as a fingerprint, palm print, handprint, or vein pattern of a user. In certain embodiments, the biometric sensor is a capacitive fingerprint sensor which utilizes mutual capacitance sensing techniques between selected sensor electrodes in a second mode to detect presence of a finger or other biometric object in a sensing area. In a fingerprint sensor embodiment, for example, upon detection of a finger, the fingerprint sensor may utilize a full array of sensor electrodes, including the same selected sensor electrodes, in a first mode to capture an image of a fingerprint in the sensing area using mutual capacitance or self-capacitance sensing techniques.

Turning now to the processing system 104 from FIG. 1, basic functional components of the electronic device 100 utilized during capturing and storing a user fingerprint image are illustrated. The processing system 104 includes a processor(s) 106, a memory 108, a template storage 110, an operating system (OS) 112 and a power source(s) 114. Each of the processor(s) 106, the memory 108, the template storage 110, the operating system 112 and power source 114 are interconnected physically, communicatively, and/or operatively for inter-component communications.

As illustrated, processor(s) 106 is configured to implement functionality and/or process instructions for execution within electronic device 100 and the processing system 104. For example, processor 106 executes instructions stored in memory 108 or instructions stored on template storage 110. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. The template storage 110 is generally configured to store enrollment views for fingerprint images for a user's fingerprint. The template storage 110 may further be configured for long-term storage of information. In some examples, the template storage 110 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The processing system 104 also hosts an operating system 112. The operating system 112 controls operations of the components of the processing system 104. For example, the operating system 112 facilitates the interaction of the processor(s) 106, memory 108 and template storage 110.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material.

Fingerprint sensors are sometimes referred to as swipe sensors or placement sensors depending on their principle of operation. Typically, swipe sensors capture an image that is larger than the sensing area by capturing a series of scans of the fingerprint as the user swipes or otherwise moves their finger over the sensing area. A processing system then reconstructs the scans into a larger swipe image. Since the image is reconstructed from a series of scans, this allows the sensing array to be made small, such as a small two-dimensional array or even as small as a single linear array, while still capturing a series of scans that can be reconstructed into a larger area image. Placement sensors typically capture an image that corresponds to the size of the sensing area by capturing scans of the fingerprint as it is placed or otherwise held over the sensing area. Usually, placement sensors include a two dimensional sensor array that can capture a sufficient area of the fingerprint in a single scan, allowing the fingerprint image to be captured without the user having to move the finger during the image capture process.

Figure 2:
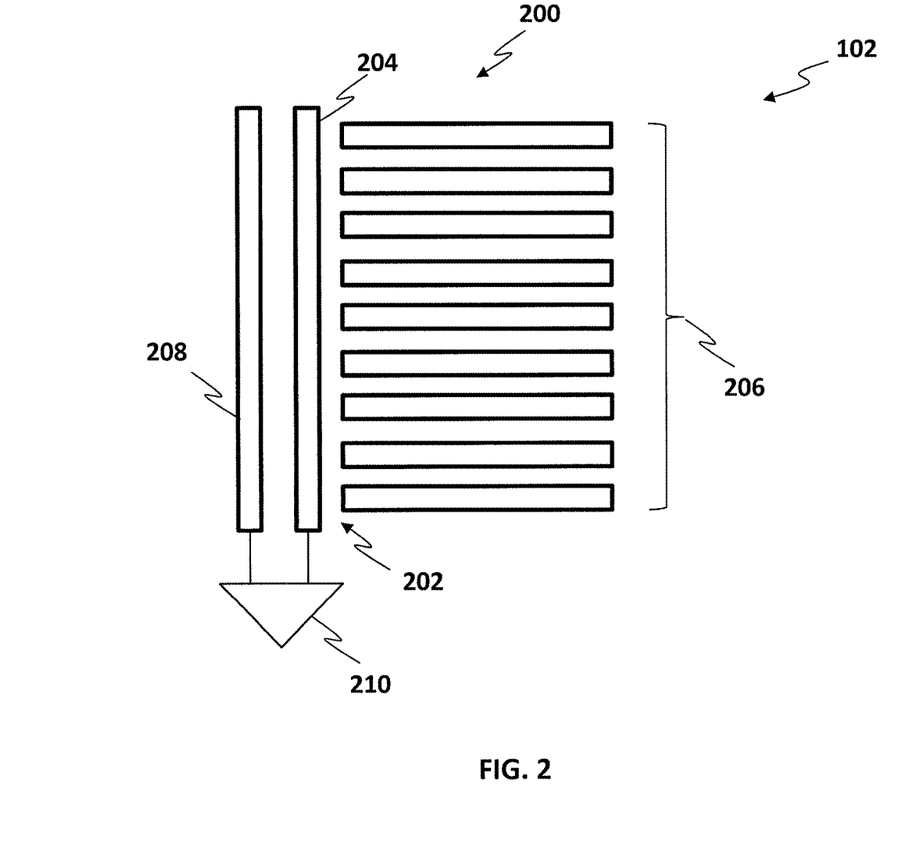
FIG. 2 is a schematic view of a capacitive sensor, in accordance with an embodiment of the disclosure.

Turning now to FIG. 2, a sensor 102 is illustrated according to an embodiment of this disclosure. The sensor 102 is configured as a capacitive sensor that includes a plurality of electrodes 200, including a set of transmitter electrodes 206 and a receiver electrode 204, arranged in a linear one dimensional capacitive gap array. A pixel is formed at the capacitive coupling between each of the transmitter electrodes 206 and the receiver electrode 204. In the depicted embodiment, the sensor electrodes 200 are operated in a first mode to capture an image of a fingerprint by driving transmitter signals onto each of the transmitter signals 206, and detecting resulting signals at the receiver electrode 204 that correspond to the transmitter signals. In one implementation, the transmitter signals are driven onto each of the transmitter electrodes 206 one at a time, in a sequence one after another. In another implementation, transmitter signals are driven onto multiple transmitter electrodes simultaneously, using a code division multiplexing (CDM) or time-division multiplexing (TDM) sensing scheme.

Additionally, in the embodiment illustrated in FIG. 2, a reference receiver electrode 208 is illustrated. The reference receiver electrode 208 is located farther away from the transmitter electrodes 206 and is utilized as a reference to a differential measurement, such that noise is rejected at a differential output into differential amplifier 210. Additionally, while the embodiment illustrated in FIG. 2 shows only a single linear sensor array for imaging the sensing area in the first mode, it is possible to utilize an additional linear array with a corresponding receiver electrode and set of transmitter electrodes, which can be correlated to the illustrated linear array to assist with image reconstruction.

In the sensor 102 of FIG. 2, the sensor electrodes 200 may also be operated in a second mode. In the second mode, transmitter signals are driven onto one or more selected transmitter electrodes of the transmitter electrodes 206, and resulting signals corresponding to the transmitter signals are detected at a set of one or more other transmitter electrodes selected from the set of transmitter electrodes 206. In this mode, it is possible to detect mutual capacitance between parallel extending electrodes by operating one or more selected transmitter electrodes as receivers, which may be useful to detect presence of a finger over the sensor, among other uses. This may also allow the presence of the finger or another input object to be detected with less power consumption than used in imaging with the full sensor array 102 in the first mode.

In the illustrated embodiment, the transmitter electrodes 206 and the receiver electrode 204 are coplanar with each other, and an array of pixels are formed at the array of capacitive gaps 202 between the ends of each transmitter electrode 206 and the receiver electrode 204. In another embodiment, the receiver electrode 204 and the transmitter electrodes 206 are configured to overlap, and the receiver electrode 204 and transmitter electrodes are formed in the same or separate substrates separated by insulator at each location where they overlap.

Moreover, while the illustrated embodiment depicts a plurality of transmitter electrodes 206 coupled to a common receiver electrode 204 to form a sensor array, in another embodiment, it is possible to use a similar construction having the receiver electrodes and transmitter electrodes reversed, so that a plurality of receiver electrodes are capacitively coupled to a common transmitter electrode to form the sensor array.

Figure 3A:
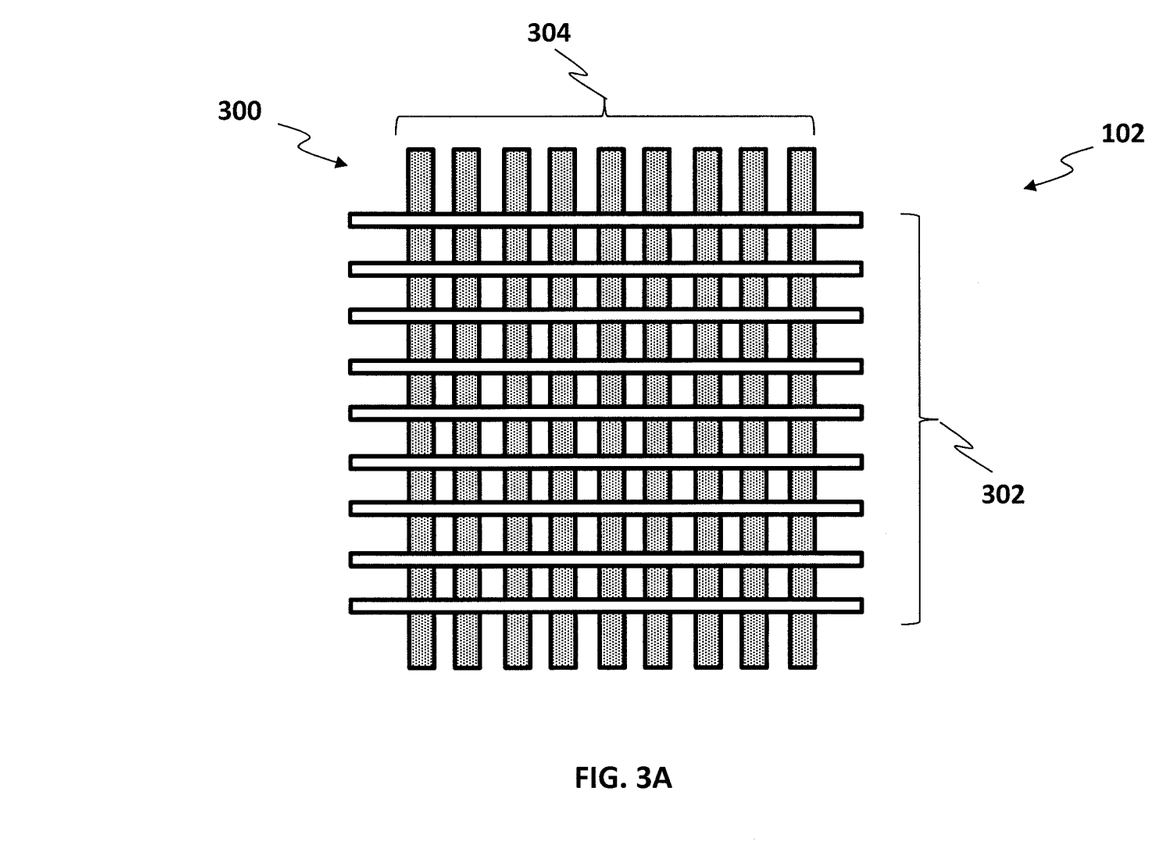
FIG. 3A is a schematic view of a capacitive sensor, in accordance with an embodiment of the disclosure.
Figure 3B:
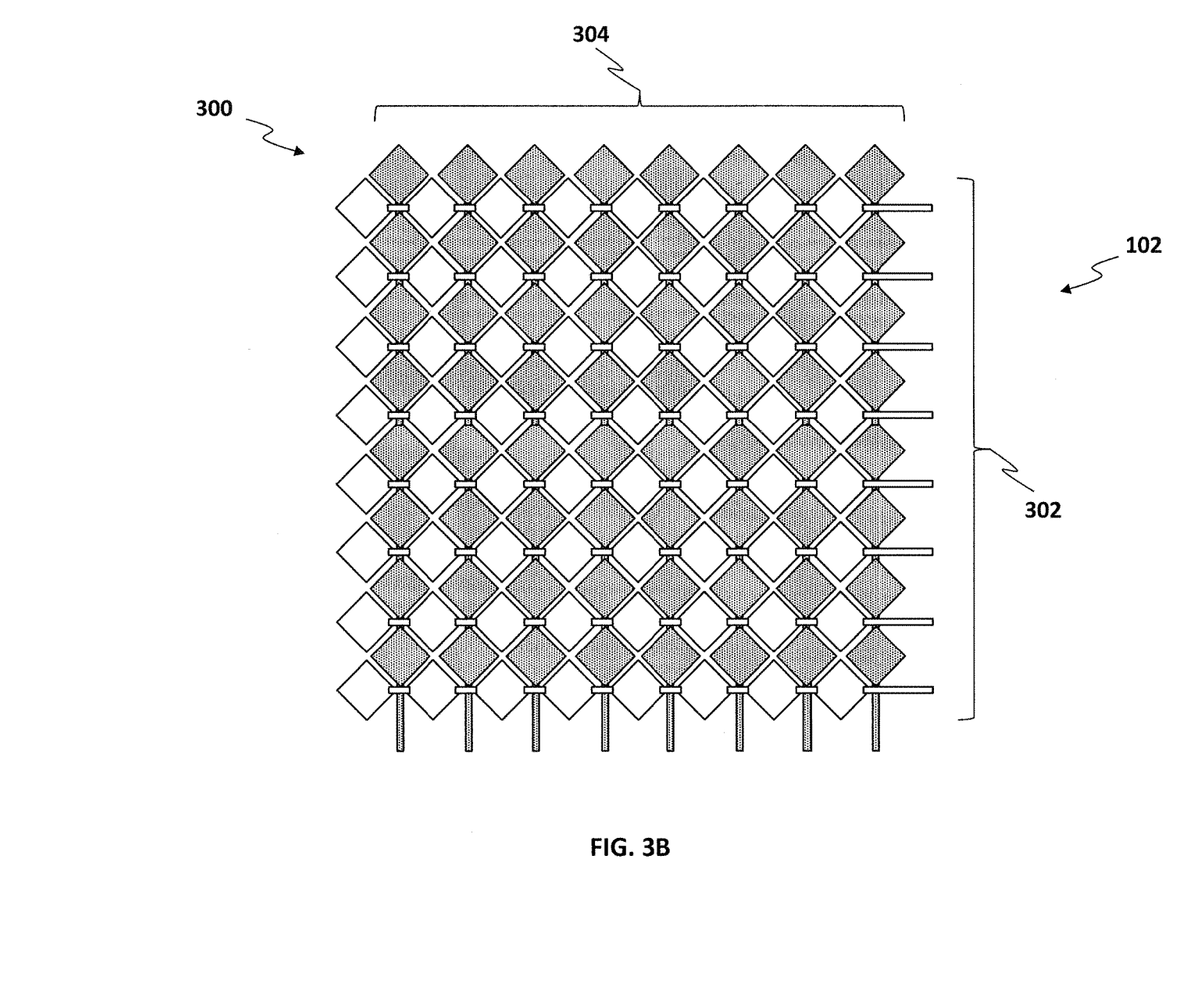
FIG. 3B is a schematic view of a capacitive sensor, in accordance with an embodiment of the disclosure.

FIGS. 3A-3B illustrate additional embodiments of sensor 102. As shown, sensor 102 is configured as a capacitive sensor that includes a plurality of electrodes 300 which form a two-dimensional array of pixels. In the sensor 102 of FIGS. 3A-3B, rows of receiver electrodes 302 overlap columns of transmitter electrodes 304 to form a pixel based on a capacitive coupling at each overlap location. In one implementation, the receiver electrodes 302 and transmitter electrodes 304 are formed on the same substrate. In another implementation, they are formed on different substrates. In either case, some dielectric may separate the set of transmitter electrodes 304 and the set of receiver electrodes 302 at each overlap location, and one of the sets may be closer to a sensing area where a finger or other object is placed. In one implementation, the receiver electrodes 302 are disposed closer to a sensing area of the capacitive sensor 102, and selected receiver electrodes are operated in a low power mode to detect presence of a finger.

In the embodiment illustrated in FIG. 3A, the transmitter electrodes 304 and receiver electrodes 302 are depicted as sets of bars and stripes, respectively. The transmitter electrodes 304 each extend parallel to each other, and the receiver electrodes 302 also extend parallel to each other, in a different direction from the transmitter electrodes to form a two-dimensional array of pixels. In the illustrated embodiment, the transmitter electrodes and receiver electrodes extend perpendicular to each other. The transmitter electrodes and receiver electrodes may be formed, for example, on separate respective substrates, or opposing sides of the same substrate, and in either case the substrate material may separate the transmitter electrodes 304 and receiver electrodes 302 to form capacitive gaps between them at each overlap location.

In the embodiment illustrated in FIG. 3B, the transmitter electrodes 304 and receiver electrodes 302 are depicted as forming a diamond sensor pattern. In this embodiment, rows of receiver electrodes overlap columns of transmitter electrodes. Specifically, each of the transmitter electrodes 304 is made up of a set of interconnected diamonds, and each of the transmitter electrodes extends parallel to each other. Similarly, each of the receiver electrodes 302 is made up of a set of interconnected diamonds, and each of the receiver electrodes extends parallel to each other, perpendicular to the transmitter electrodes. In the illustrated embodiment, the receiver electrodes overlap the transmitter electrodes at narrower portions along the length of each electrode. The diamond sensor pattern of FIG. 3B may be formed in a variety of ways. For example, the receiver electrodes and transmitter electrodes may be formed in the same layer, on the same side of an insulating substrate. Small amounts of dielectric may be used over the narrower portions of the transmitter electrodes 304, so that the diamonds of each receiver electrode can be interconnected with conductive material over the transmitter electrodes, without creating ohmic contact between the receiver electrodes and transmitter electrodes. The diamond pattern may also be formed with the receiver electrodes and transmitter electrodes on separate substrates, or opposing sides of the same substrate, as described above.

It will be appreciated that other sensor array patterns are possible without departing from the principles described herein. For example, other electrode shapes besides diamond patterns, bars, and stripes are possible without departing from certain principles described herein. Similarly, other electrode orientations besides perpendicular rows and columns are possible without departing from certain principles described herein. It will also be appreciated that transmitter signals can be driven onto each of the transmitter electrodes 304 and resulting signals can be detected at each of the receiver electrodes 302 using a variety of modulation schemes in order to capture an image of the sensing area. In one implementation, the transmitter signals are driven onto each of the transmitter electrodes 304 one at a time, in a sequence one after another. In another implementation, transmitter signals are driven onto multiple transmitter electrodes simultaneously and/or resulting signals are detected at each of the receiver electrodes simultaneously, using a code division multiplexing (CDM) or time-division multiplexing (TDM) sensing scheme.

The processing system 104 (see FIG. 1) is also configured to operate capacitive sensor systems such as those illustrated in FIGS. 2 and 3. FIGS. 4-7 depict various embodiments of how selected electrodes from the sensors 102 in FIGS. 2 and 3A-3B may be operated in an alternate mode, such as a finger presence detection mode, in accordance with principles described herein. While the illustrations of FIGS. 4-7 depict parallel bars/stripes, it will be appreciated that these techniques can also be applied to parallel diamond shaped electrodes, e.g., as shown in FIG. 3B, or other sensor patterns, without departing form the scope of the principles described therein.

Figure 4:
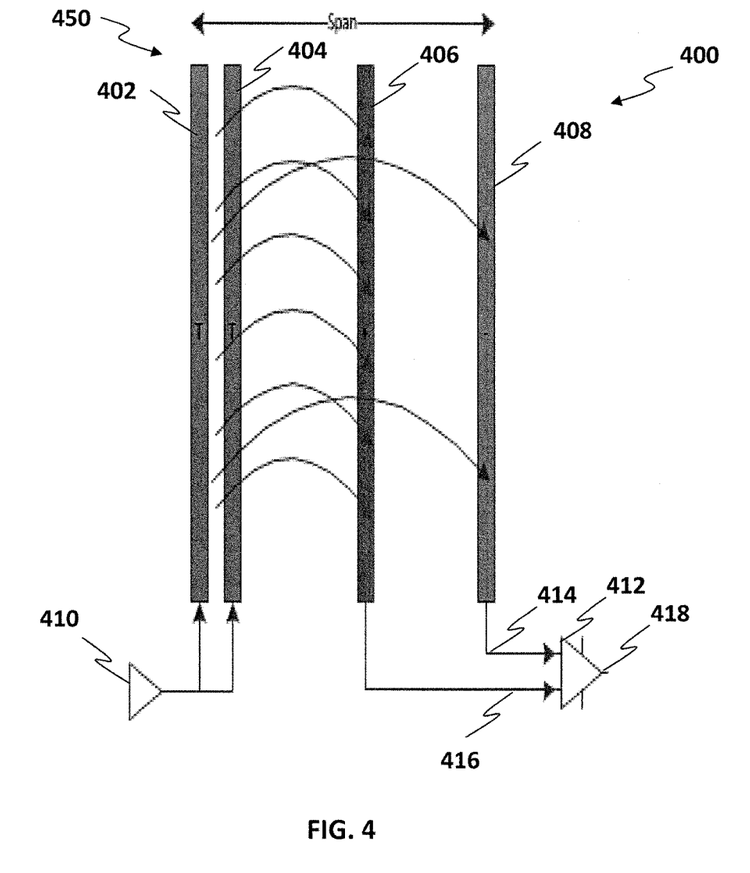
FIG. 4 is a schematic view of a capacitive sensor configured to provide presence detection functionality, in accordance with an embodiment of the disclosure.

Turning now to FIG. 4, an embodiment where the processing system 104 operates a subset of electrodes 400 of the plurality of electrodes 200, 300. The sensor electrodes may be operated in this mode, for example, to detect presence of a finger using lower power consumption than utilized when the full sensor array is operated to capture an image of the sensing area. In the low power mode, non-essential systems of the capacitive sensor 102 may be turned off such that less power is consumed. Accordingly, any amplifier or transmitter or switch not required to function in order to provide the finger presence detection functionality may be turned off. In addition, in certain implementations, circuits used to operate the selected electrodes may be operated with a lower duty cycle than when operated in a regular image scan mode, while still being able to detect presence of a finger or other biometric object with even the fastest human response.

In the embodiment illustrated in FIG. 4, at least one first electrode (Tx 402 and 404 in the illustrated embodiment) of the plurality of electrodes 200, 300 is driven with a transmitter signal(s) from a transmitter 410. Additionally, at least one second electrode of the plurality of electrodes 200, 300 (Rx+ 406 and Rx− 408 in the illustrated embodiment) is configured to detect a signal corresponding to the transmitter signal driven onto the at least one first electrode. In some embodiments, the at least one first electrode and the at least one second electrode are selected from the set of one or more receiver electrodes 204, 302, and in other embodiments, the at least one first electrode and the at least one second electrode are selected from the set of one or more transmitter electrodes 206, 304 (see FIGS. 2 and 3).

In certain embodiments, when the processing system 104 configures the subset of electrodes 400 from the plurality of electrodes 200, 300 to function in the second mode, the subset of electrodes are selected from existing electrodes of a capacitive sensor, such as those illustrated in FIGS. 2 and 3. Moreover, in certain embodiments, the existing electrodes of the capacitive sensor utilized in the second mode are selected entirely from either the transmitter electrodes or the receiver electrodes of the plurality of electrodes 200, 300.

Further, in embodiments where the set of receiver electrodes 302 (see FIG. 3A-3B) overlap the set of transmitter electrodes 304, as illustrated in FIG. 3A-3B, one of the set of receiver electrodes 302 or the set of transmitter electrodes 304 may be closer to the sensing area of the capacitive sensor 102. In these embodiments, the processing system 104 (see FIG. 1) may be configured to drive the transmitter signals of the second mode and detect the resulting signals of the second mode using electrodes selected from the set closer to the sensing area of the capacitive sensor 102. In certain embodiments, the set of receiver electrodes 302 are closer to the sensing area of the capacitive sensor 102, and therefore, the at least one first electrode (Tx 402 and 404 in the illustrated embodiment) and the at least one second electrode (Rx+ 406 and Rx− 408 in the illustrated embodiment) are selected from the set of receiver electrodes 302.

In the illustrated embodiment, the at least one first electrode includes two electrodes, Tx 402 and 404, and the at least one second electrode includes two electrodes Rx+ 406 and Rx− 408. However, in different implementations, it is possible to drive and detect on more or fewer electrodes, e.g., based on the dimensions of the sensor pattern and the electric fields extending above the sensor pattern that can be affected by finger touch.

Further, in the illustrated embodiment, the at least one second electrode includes two electrodes, Rx+ 406 and Rx− 408. Rx+ 406 and Rx− 408 are configured to detect resulting signals corresponding to the transmitter signal driven onto Tx 404 and Tx 402. The resulting signals are provided to a differential amplifier 412 with Rx+ 406 connected to a positive input 416 of the differential amplifier 412 and Rx− 408 connected to a negative input 414 of the differential amplifier 412. Additionally, in the illustrated embodiment, Rx+ 406 is closer than Rx− 408 to the electrodes Tx 402 and 404 that are driven with transmitter signals. This arrangement generates an imbalanced differential signal provided to the differential amplifier 412. This imbalanced signal has the beneficial effect of removing more noise from the differential measurement being performed by the differential amplifier 412. In this configuration, common mode noise coupled onto Rx+ 406 and Rx− 408 is removed in output 418 of the differential amplifier 412.

Accordingly, output 418 is a low noise gain signal that correlates to an amount of energy capacitively coupled from Tx 402 and 404 to Rx+ 406. The amount of energy coupled from Tx− 402 and 404 to Rx+ 406 is affected by the presence of a biometric object such as a fingerprint. When a biometric object is present in the sensing area of a capacitive sensor 102, such as sensors illustrated in FIGS. 2 and 3, output 418 will be less in value than when no biometric object is present. In this regard, output 418 can be utilized to detect for the presence of a biometric object over a sensing area of a capacitive sensor such as those illustrated in FIGS. 2 and 3.

In order to determine whether the biometric object is present in the sensing area of the capacitive sensor 102, the processing system 104 of the electronic device 102 may compare a signal level of output 418 to a threshold signal level to determine if the signal level of the output 418 is beyond the threshold. Based on this comparison, the processing system 104 may maintain operation of the capacitive sensor 102 in the second mode or return operation to the first mode.

In certain embodiments, the threshold is a preset threshold based on a typical signal level of output 418 when the biometric object is not present in the sensing area. Accordingly, when the biometric object such as the user's fingerprint is present, the signal level of output 418 will drop below the threshold due to the interference of the capacitive coupling from Tx 402 and 404 to Rx+ 406. The output signal 418 dropping below the threshold indicates that the capacitive sensor 102 (see FIGS. 1, 2, and 3) should be taken out of the low power mode and returned to a first mode of operation in order to obtain an image of a biometric pattern, such as the user's fingerprint.

Figure 5:
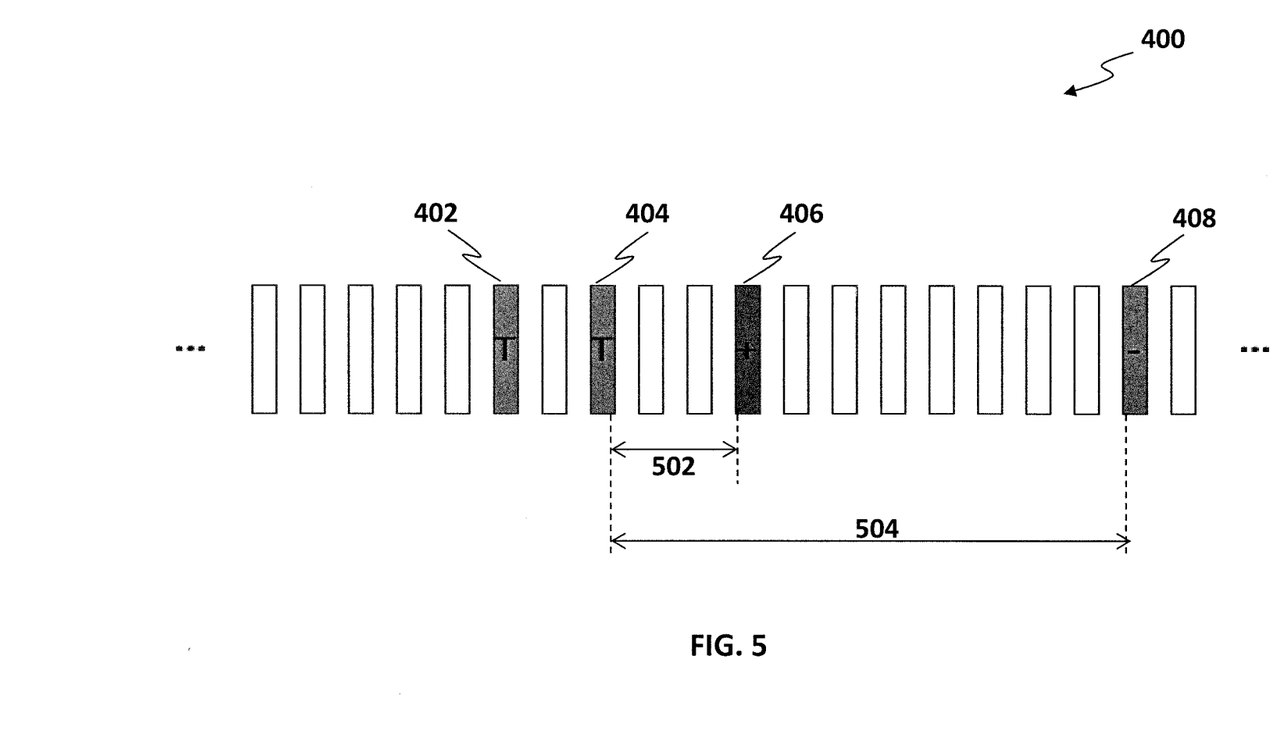
FIG. 5 is a view of electrodes of a capacitive sensor configured to provide presence detection functionality, in accordance with an embodiment of the disclosure.

FIG. 5 illustrates Tx 402, Tx 404, Rx+ 406 and Rx− 408 from FIG. 4 relative to other electrodes. A spacing 502 is shown between Tx 402/404 and Rx+ 406. In the illustrated embodiment, the spacing is shown to encompass two electrodes; however, this could be more or less. Spacing 502 is provided such that Tx 404 and Rx+ 406 are not so close that the presence of the biometric object over Tx 404 and Rx+ 406 is able to measurably affect the capacitive coupling between these two electrodes, e.g., so that the object can disrupt electric field lines between Tx 402, 404 that extend into a sensing region above the electrodes. Alternatively, if Tx 404 and Rx+ 406 are adjacent, then the capacitive coupling of the transmit signal from Tx+ 404 to Rx+ 406 could potentially be too strong to materially change even when the biometric object is present in the sensing area.

FIG. 5 further illustrates spacing 504, which as discussed earlier is larger than spacing 502. Once again, this arrangement generates an imbalanced differential signal provided to the differential amplifier 412. This imbalanced signal has the beneficial effect of removing noise from the differential measurement being performed by the differential amplifier 412.

Figures 6A, 6B:
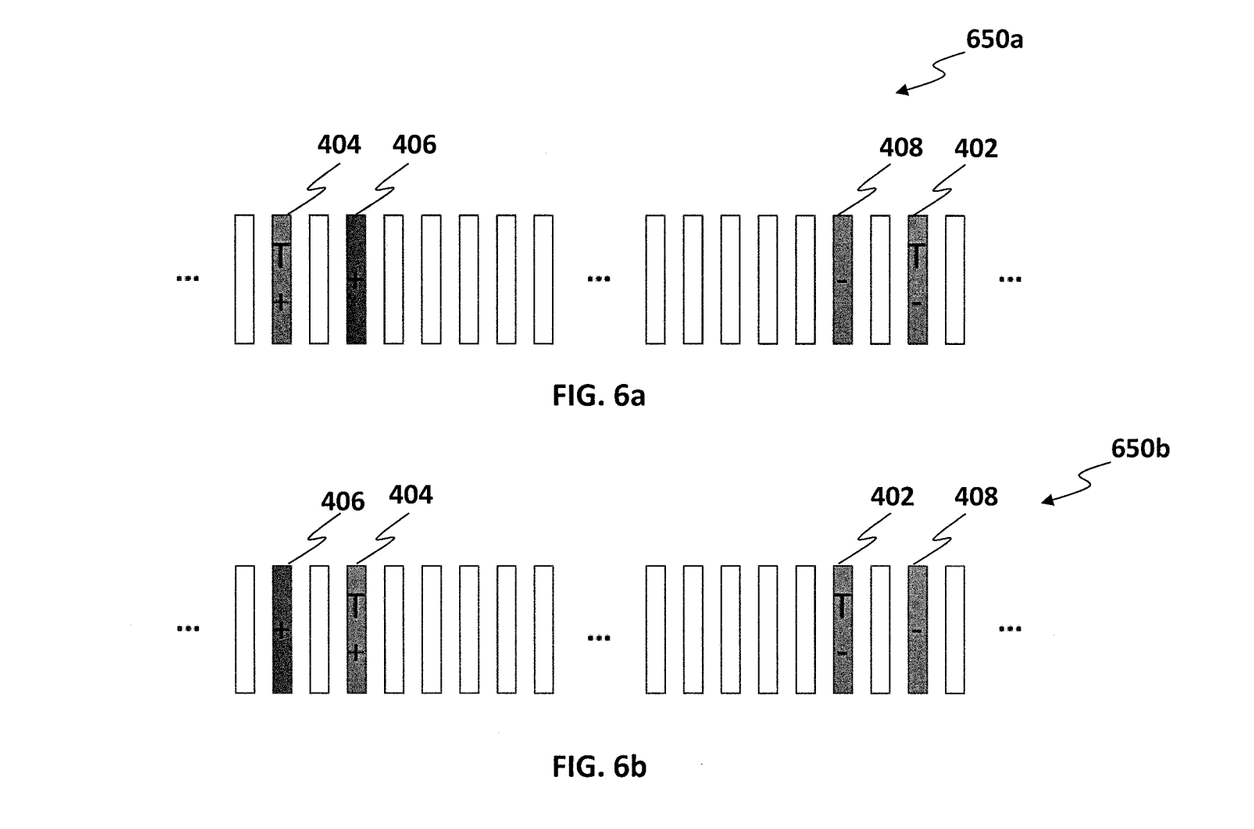
FIG. 6a is a view of electrodes of a capacitive sensor configured to provide presence detection functionality, in accordance with an embodiment of the disclosure.
FIG. 6b is a view of electrodes of a capacitive sensor configured to provide presence detection functionality, in accordance with an embodiment of the disclosure.
Figure 7:
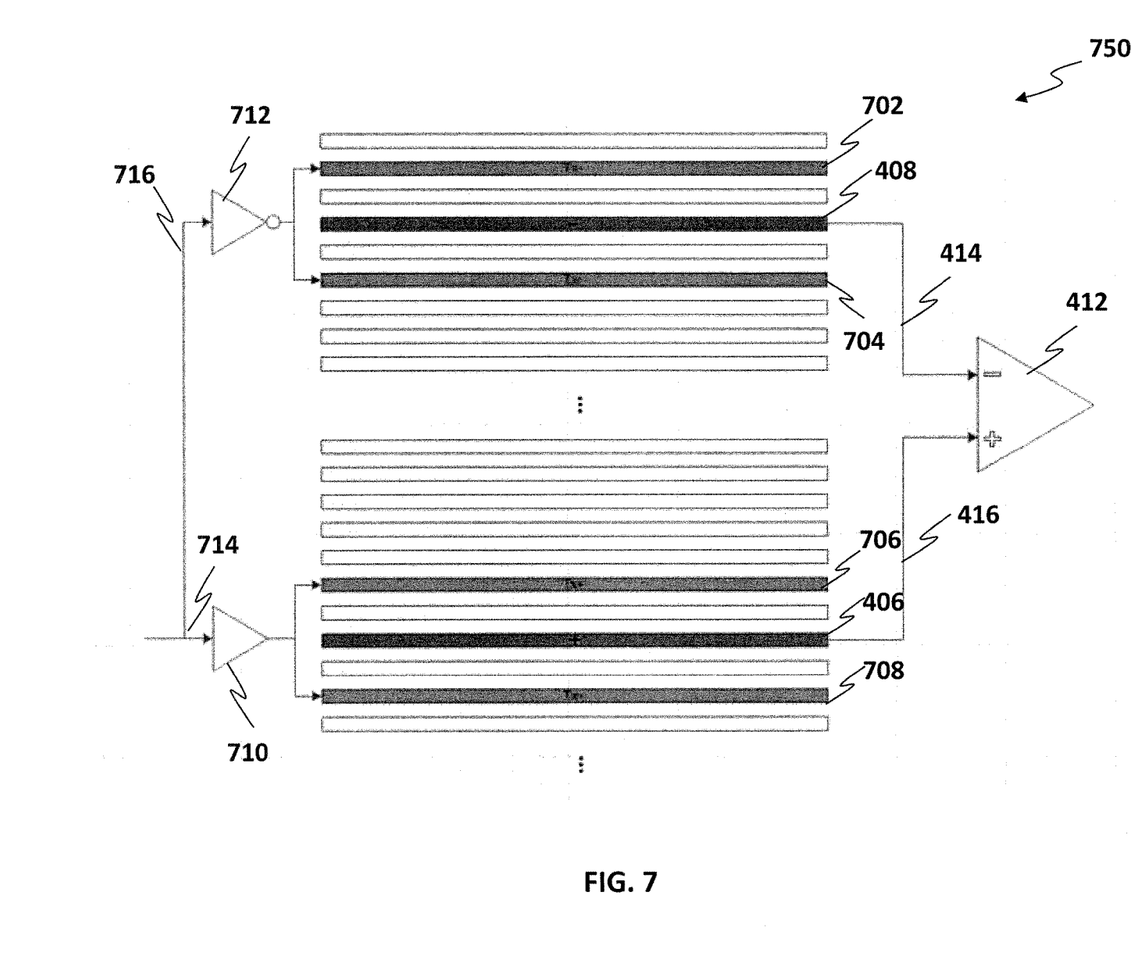
FIG. 7 is a schematic view of a capacitive sensor configured to provide presence detection functionality, in accordance with an embodiment of the disclosure.

FIGS. 6a, 6b and 7 illustrate presence detection system 650a, 650b according to additional embodiments of this disclosure. In these embodiments, at least two electrodes are driven with transmitter signals having opposite polarity to each other (depicted as Tx+ and Tx−) in order to increase the resulting signals that are detected.

FIG. 6a illustrates an embodiment of the wake on finger system 650a where Tx+ 404 and Rx+ 406 are located close together and Tx− 402 and Rx− 408 are located close together with both Tx+ 404 and Tx− 402 on the outside of Rx+ 406 and Rx− 408. While in the illustrated embodiment, only a single electrode is disposed between each of T+ 404 and Rx+ 406 and Tx− 402 and Rx− 408, in other embodiments, this separation may include more than one electrode. Additionally, in the illustrated embodiment, a plurality of electrodes is disposed between the Rx+ 406 and Rx− 408 electrodes. By having Tx+ 404 and Rx+ 406 located close together and Tx− 402 and Rx− 408 located close together and a relatively larger separation between Rx+ 406 and Rx− 408, the signal level provided to the positive input 416 and the negative input 414 of the differential amplifier 412 is increased.

FIG. 6b illustrates an embodiment of a presence detection system 650b similar to FIG. 6a except that the position of the Rx+ 406 and Rx− 408 are located to the outside of the Tx+ 404 and the Tx− 402 electrodes. This configuration operates similarly to the embodiment illustrated in FIG. 6a such that the signal level provided to the positive input 416 and the negative input 414 of the differential amplifier 412 is increased.

FIG. 7 illustrates another embodiment of a presence detection system 750. In this embodiment, transmitter signals are driven onto at least four electrodes, illustrated as a first Tx− 702, a second Tx− 704, a first Tx+ 706 and a second Tx+ 708. A pair of electrodes Tx− 702 and 704 are driven with transmitter signals having opposite polarity to the pair of electrodes Tx+ 706 and 708. In addition, the electrodes Rx− 408 and Rx+ 406 (see FIG. 4) are disposed between their respective pairs of electrodes driven with transmitter signals. Specifically, Rx− 408 is disposed between the first Tx− 702 and the second Tx− 704, and Rx+ 406 is disposed between the first Tx+ 706 and the second Tx+ 708.

FIG. 7 further illustrates a first transmitter 710 and a second transmitter 712. The first transmitter couples a first transmit signal 714 onto the first Tx+ 706 and the second Tx+ 708, and the second transmitter 712 couples a second transmit signal 716 that is the same as the first transmit signal but with opposite polarity onto the first Tx− 702 and the second Tx− 704. In the illustrated embodiment, the second transmitter 712 is configured as an inverter. Because there are at least twice as many electrodes configured to couple the first transmit signal 714 or the second transmit signal 716 onto the Rx+ 406 and Rx− 408, respectively, the first resulting signal level provided to the positive input 416 and the second resulting signal level provided to the negative input 414 of the differential amplifier 412 are increased. In this regard, the processing system 104 (see FIG. 1) is able to perform a differential measurement between the first resulting signal and the second resulting signal.

Figure 8:
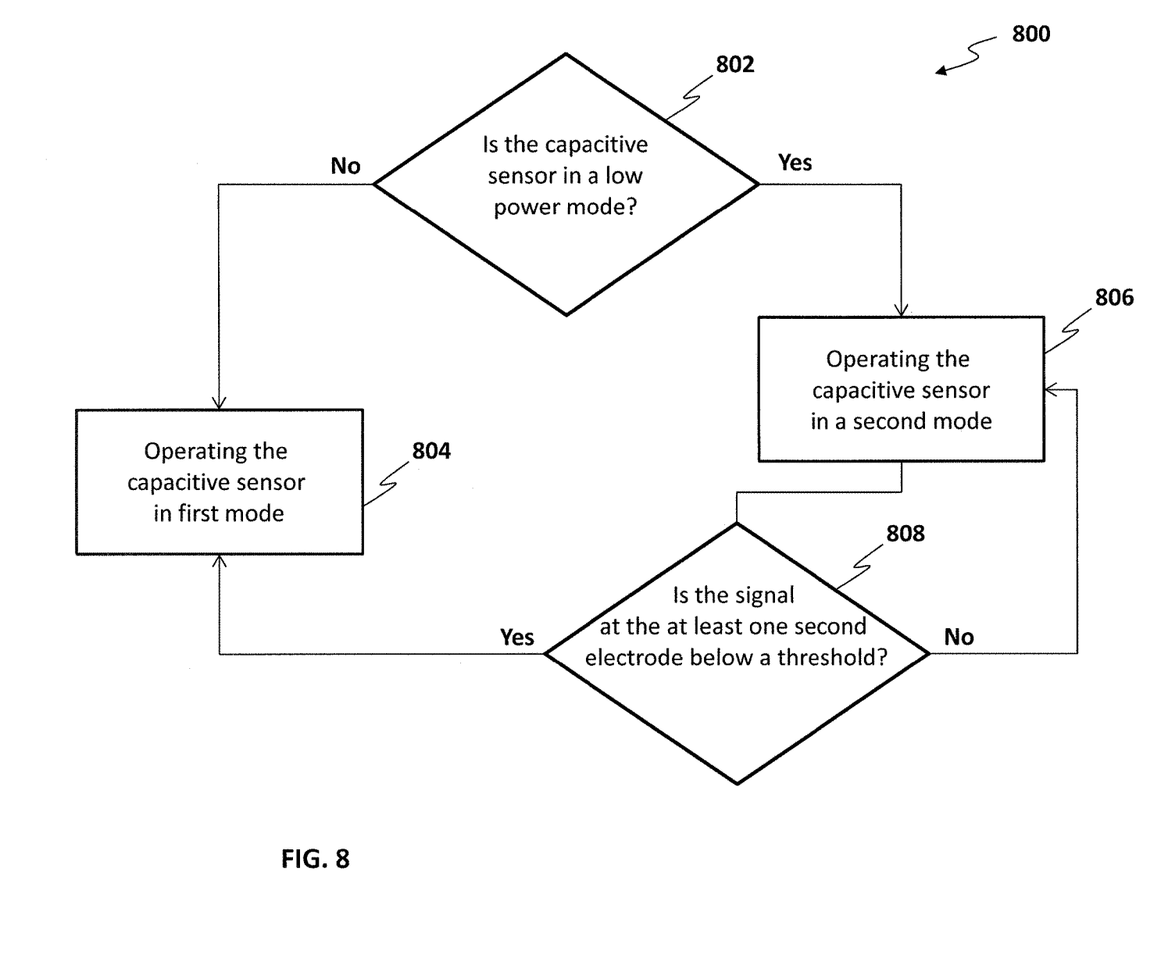
FIG. 8 is a flow diagram for a method of operating a capacitive sensor, in accordance with an embodiment of the disclosure.

FIG. 8 illustrates a method 800 of operating a plurality of sensor electrodes for capacitive sensing. The method 800 determines whether a capacitive sensor 102 (see FIGS. 1, 2 and 3A-3B) is operating in a low power mode at block 802. At block 804, if the capacitive sensor is not in the low power mode, then the processing system 104 (see FIG. 1) operates the capacitive sensor 102 in a first mode by driving transmitter signals onto each of the transmitter electrodes 206/302 and receiving resulting signals at the receiver electrodes 204/304. The resulting signals detected at the receiver electrodes 204/302 correspond to the transmitter signals driven onto the transmitter electrodes 206/304.

If at block 802, the processing system 104 (see FIG. 1) determines that the capacitive sensor 102 is in the low power mode, then the processing system 104, at block 806, operates the capacitive sensor 102 in a second mode by driving transmitter signals onto at least one first electrode of the plurality of sensor electrodes (200, 300) and detecting resulting signals at at least one second electrode of the plurality of sensor electrodes (200, 300). The resulting signals detected at the at least one second electrode correspond to the transmitter signals driven onto the at least one first electrode. The at least one first electrode and the at least one second electrode are selected from one of the receiver electrodes 204/302 or the transmitter electrodes 206/304 (see FIGS. 2 and 3A-3B).

At block 808, the processing system 104 (see FIG. 1) determines whether the resulting signals detected at the last least one second electrode are below a threshold. If the resulting signals are not below a threshold the method 800 returns to block 806 and continues to operate the capacitive sensor 102 in the second mode. However, if the resulting signals are below the threshold, then the method 800 determines that a biometric object, such as a fingerprint, is disposed in the sensing area of the capacitive sensor 102 and proceeds to operate the capacitive sensor 102 in the first mode, at block 804.

The embodiments and examples set forth herein were presented in order to best explain the present disclosure and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device for capacitive sensing, the input device comprising:
    a plurality of sensor electrodes of a capacitive sensor, the plurality of sensor electrodes including a set of one or more transmitter electrodes and a set of one or more receiver electrodes; and
    a processing system coupled to the plurality of sensor electrodes and configured to:
    operate in a first mode by driving transmitter signals onto each of the transmitter electrodes and detecting resulting signals at each of the receiver electrodes, the resulting signals detected at the receiver electrodes corresponding to the transmitter signals driven onto the transmitter electrodes, and
    operate in a second mode by driving transmitter signals onto at least one first electrode of the plurality of sensor electrodes and detecting resulting signals at at least one second electrode of the plurality of sensor electrodes, the resulting signals detected at the at least one second electrode corresponding to the transmitter signals driven onto the at least one first electrode,
    wherein, in the second mode, a) each of the at least one first electrode and the at least one second electrode are selected from the set of receiver electrodes, or b) each of the at least one first electrode and the at least one second electrode are selected from the set of transmitter electrodes.

2. The input device of claim 1, wherein the processing system is configured to obtain an image of a biometric pattern in a sensing area when operating in the first mode.

3. The input device of claim 1, wherein the processing system is configured to obtain an image of a fingerprint in a sensing area when operating in the first mode.

4. The input device of claim 1, wherein the processing system is configured to detect presence of an object in a sensing area when operating in the second mode.

5. The input device of claim 4, wherein the processing system is configured to detect the presence of the object by determining whether the resulting signals detected at the at least one second electrode are beyond a threshold.

6. The input device of claim 1, wherein the processing system is configured to:
    obtain an image of a fingerprint in a sensing area when operating in the first mode,
    detect presence of a finger in the sensing area when operating in the second mode, and
    initiate the first mode in response to detecting the presence of the finger in the second mode.

7. The input device of claim 1, wherein each of the at least one first electrode and the at least one second electrode are selected from the set of receiver electrodes.

8. The input device of claim 1, wherein the set of receiver electrodes overlaps the set of transmitter electrodes, wherein one of the sets is closer to a sensing area of the plurality of sensor electrodes than the other set, and wherein the processing system is configured to drive the transmitter signals of the second mode and detect the resulting signals of the second mode using electrodes selected from the set closer to the sensing area.

9. The input device of claim 1, wherein the set of receiver electrodes overlaps the set of transmitter electrodes, wherein the set of receiver electrodes is closer to a sensing area of the plurality of sensor electrodes than the set of transmitter electrodes, and wherein each of the at least one first electrode and the at least one second electrode are selected from the set closer to the sensing area.

10. The input device of claim 1,
    wherein the at least one second electrode is at least two second electrodes,
    wherein one of the at least two second electrodes is closer to the at least one first electrode than the other of the at least two second electrodes, and
    wherein the processing system is configured to detect the resulting signals of the second mode by taking a differential measurement between the at least two second electrodes.

11. The input device of claim 1,
    wherein the at least one first electrode includes at least two first electrodes,
    wherein the at least one second electrode includes at least two second electrodes,
    wherein the processing system is configured to operate in the second mode by:
    driving first transmitter signals onto at least one first electrode of the at least two first electrodes and detecting first resulting signals corresponding to the first transmitter signals at at least one second electrode of the at least two second electrodes, and
    driving second transmitter signals having opposite polarity to the first transmitter signals onto at least one other first electrode of the at least two first electrodes and detecting second resulting signals corresponding to the second transmitter signals at at least one other second electrode of the at least two second electrodes.

12. The input device of claim 11, wherein the processing system is configured to detect the first resulting signals and the second resulting signals by taking a differential measurement between the first resulting signals and the second resulting signals.

13. The input device of claim 1,
    wherein the at least one first electrode includes at least four first electrodes,
    wherein the at least one second electrode includes at least two second electrodes,
    wherein the processing system is configured to operate in the second mode by:
    driving first transmitter signals onto at least two first electrodes of the at least four first electrodes and detecting first resulting signals corresponding to the first transmitter signals at at least one second electrode of the at least two second electrodes, the at least one second electrode being disposed between the at least two first electrodes, and
    driving second transmitter signals having opposite polarity to the first transmitter signals onto at least two other first electrodes of the at least four first electrodes and detecting second resulting signals corresponding to the second transmitter signals at at least one other second electrode of the at least two second electrodes, the at least one other second electrode being disposed between the at least two other first electrodes.

14. The input device of claim 13, wherein the processing system is configured to detect the first resulting signals and the second resulting signals by taking a differential measurement between the first resulting signals and the second resulting signals.

15. The input device of claim 1,
wherein each of the transmitter electrodes extend parallel to each other,
wherein each of the receiver electrodes extend parallel to each other and overlap with the transmitter electrodes,
wherein the resulting signals in the first mode correspond to capacitive effects between overlapping electrodes generated by the transmitter signals driven onto each of the transmitter electrodes, and
wherein the resulting signals in the second mode correspond to capacitive effects between parallel electrodes generated by the transmitter signals driven onto the at least one first electrode.

16. The input device of claim 1,
wherein the plurality of sensor electrodes form a capacitive two-dimensional array,
wherein the capacitive two-dimensional array is configured to capture an image of a fingerprint placed in a sensing area over the capacitive two-dimensional array when operated in the first mode.

17. The input device of claim 1,
wherein the plurality of sensor electrodes form a capacitive linear array,
wherein the capacitive linear array is configured to capture an image of a fingerprint swiped in a sensing area over a capacitive linear array when operated in the first mode.

18. The input device of claim 1, wherein the processing system is configured to use less power when operating in the second mode than when operating in the first mode.

19. An electronic system for capacitive sensing, the electronic system comprising:
a processing system configured to operate a plurality of sensor electrodes of a capacitive sensor, the plurality of sensor electrodes including a set of one or more transmitter electrodes and a set of one or more receiver electrodes, wherein the processing system is configured to:
operate in a first mode by driving transmitter signals onto each of the transmitter electrodes and detecting resulting signals at each of the receiver electrodes, the resulting signals detected at the receiver electrodes corresponding to the transmitter signals driven onto the transmitter electrodes, and
operate in a second mode by driving transmitter signals onto at least one first electrode of the plurality of sensor electrodes and detecting resulting signals at at least one second electrode of the plurality of sensor electrodes, the resulting signals detected at the at least one second electrode corresponding to the transmitter signals driven onto the at least one first electrode,
wherein, in the second mode, a) each of the at least one first electrode and the at least one second electrode are selected from the set of receiver electrodes, or b) each of the at least one first electrode and the at least one second electrode are selected from the set of transmitter electrodes.

20. The electronic system of claim 19, wherein each of the at least one first electrode and the at least one second electrode are selected from the set of receiver electrodes.

21. The electronic system of claim 19, wherein the processing system is configured to obtain an image of a fingerprint in a sensing area when operating in the first mode.

22. The electronic system of claim 19,
wherein the at least one second electrode is at least two second electrodes,
wherein one of the at least two second electrodes is closer to the at least one first electrode than the other of the at least two second electrodes, and
wherein the processing system is configured to detect the resulting signals of the second mode by taking a differential measurement between the at least two second electrodes.

23. The electronic system of claim 19,
wherein the at least one first electrode includes at least two first electrodes,
wherein the at least one second electrode includes at least two second electrodes,
wherein the processing system is configured to operate in the second mode by:
driving first transmitter signals onto at least one first electrode of the at least two first electrodes and detecting first resulting signals corresponding to the first transmitter signals at at least one second electrode of the at least two second electrodes, and
driving second transmitter signals having opposite polarity to the first transmitter signals onto at least one other first electrode of the at least two first electrodes and detecting second resulting signals corresponding to the second transmitter signals at at least one other second electrode of the at least two second electrodes.

24. The electronic system of claim 19,
wherein the at least one first electrode includes at least four first electrodes,
wherein the at least one second electrode includes at least two second electrodes,
wherein the processing system is configured to operate in the second mode by:
driving first transmitter signals onto at least two first electrodes of the at least four first electrodes and detecting first resulting signals corresponding to the first transmitter signals at at least one second electrode of the at least two second electrodes, the at least one second electrode being disposed between the at least two first electrodes, and
driving second transmitter signals having opposite polarity to the first transmitter signals onto at least two other first electrodes of the at least four first electrodes and detecting second resulting signals corresponding to the second transmitter signals at at least one other second electrode of the at least two second electrodes, the at least one other second electrode being disposed between the at least two other first electrodes.

25. A method for operating a plurality of sensor electrodes of a capacitive sensor, the plurality of sensor electrodes including a set of one or more transmitter electrodes and a set of one or more receiver electrodes, the method comprising:
operating in a first mode by driving transmitter signals onto each of the transmitter electrodes and detecting resulting signals at each of the receiver electrodes, the resulting signals detected at the receiver electrodes corresponding to the transmitter signals driven onto the transmitter electrodes, and operating in a second mode by driving transmitter signals onto at least one first electrode of the plurality of sensor electrodes and detecting resulting signals at at least one second electrode of the plurality of sensor electrodes, the resulting signals detected at the at least one second electrode corresponding to the transmitter signals driven onto the at least one first electrode, wherein, in the second mode, a) each of the at least one first electrode and the at least one second electrode are selected from the set of receiver electrodes, or b) each of the at least one first electrode and the at least one second electrode are selected from the set of transmitter electrodes.

* * * * *